(12) United States Patent  
Davis et al.

(10) Patent No.: US 8,174,446 B2  
(45) Date of Patent: *May 8, 2012

(54) SIGNAL PATH DELAY DETERMINATION

(75) Inventors: Richard Davis, Seattle, WA (US); Stalin Albanes, Atlanta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/169,992

(22) Filed: Jun. 27, 2011

(65) Prior Publication Data

US 2011/0254735 A1    Oct. 20, 2011

Related U.S. Application Data

(63) Continuation of application No. 12/641,513, filed on Dec. 18, 2009, now Pat. No. 7,990,317.

(51) Int. Cl.  
*G01S 1/24* (2006.01)
(52) U.S. Cl. ...................................................... 342/387
(58) Field of Classification Search .................... 342/387  
See application file for complete search history.

(56) References Cited

U.S. PATENT DOCUMENTS

| 5,327,144 A * | 7/1994 | Stilp et al. ..................... 342/387 |
| 5,812,257 A * | 9/1998 | Teitel et al. ................. 356/141.4 |
| 6,148,211 A * | 11/2000 | Reed et al. ................. 455/456.2 |
| 6,400,320 B1 * | 6/2002 | Stilp et al. ..................... 342/457 |
| 6,889,051 B2 * | 5/2005 | Ogino et al. .............. 455/456.1 |
| 7,187,327 B2 * | 3/2007 | Coluzzi et al. ................. 342/458 |
| 7,315,275 B2 * | 1/2008 | Stephens ....................... 342/146 |
| 7,652,626 B1 * | 1/2010 | Potenziani et al. ........... 342/439 |
| 7,750,841 B2 * | 7/2010 | Oswald et al. ................ 342/147 |
| 7,990,317 B2 | 8/2011 | Davis et al. |
| 2001/0053698 A1 * | 12/2001 | Karmi et al. .................. 455/456 |
| 2005/0282558 A1 * | 12/2005 | Choi et al. ................. 455/456.1 |
| 2008/0198835 A1 * | 8/2008 | Miyanaga et al. ............ 370/350 |
| 2010/0141529 A1 * | 6/2010 | Allam et al. .................. 342/387 |

* cited by examiner

*Primary Examiner* — Thomas Tarcza  
*Assistant Examiner* — Frank J McGue  
(74) *Attorney, Agent, or Firm* — Woodcock Washburn LLP

(57) ABSTRACT

Propagation time for a target signal path is determined by detecting and processing a plurality of unknown signals received at two locations. A third location is established, such that the propagation time between the third location and one of the two locations is known, and the signal path between the third location and the other of the two locations is the target signal path. The two locations are monitored for any signals that may be detected. Signals received at the two locations are processed to determine which signals have a common source, and of the signals having a common source, the signal having the greatest delay between times of reception at the two locations is selected. The selected signal is used to determine the propagation time between the two locations.

5 Claims, 7 Drawing Sheets

US 8,174,446 B2

SIGNAL PATH DELAY DETERMINATION

CROSS REFERENCE TO RELATED APPLICATIONS

The instant application is a continuation of U.S. patent application Ser. No. 12/641,513 entitled "Signal Path Delay Determination," filed Dec. 18, 2009, which is hereby incorporated by reference in its entirety.

Demands made on radio frequency (RF) technology from expanding applications are ever increasing. To meet these demands RF technology is becoming more complex, and associated signal processing is becoming more sophisticated. In order to obtain accurate results from sophisticated signal processing devices and systems, precise timing calculations/estimations associated with signal propagation in those systems are required. However, complex RF technology is subject to delays in signal propagation that detrimentally impact RF applications and RF equipment operation, interfering with both the signals and the messages carried with the signals. Whereas traditional propagation delay and timing measurements could be performed using instruments such as time domain reflectometers or oscilloscopes, these instruments may not operate if, for example, the signal path is unidirectional or if the path includes analog-to-digital or electronic time delay components. Errors in measuring propagation delay detrimentally affect many RF systems, including but not limited to radio access networks, wireless telephony systems, wireless data services, geo-location services, and radar.

SUMMARY

In an example embodiment, propagation time for a target signal path is determined by detecting and processing a plurality of unknown signals received at two receiver locations. A third location is established for processing, and is connected to the two receiving locations such that the signals received at both receiver locations are available at the processor location. The propagation time between the processing location (the third location) and one of the two receiving locations (the reference location) is known, and the propagation delay between the processing location and the other (the target location) of the two receiving locations is unknown. The propagation time between the two receiving locations may or may not be known. Signals received at the two receiving locations and available at the processing location are processed to estimate the propagation delay introduced by the unknown/target signal path (the path between the processing location and the target location). The technique employed determines and applies the timing of signal arrival at the processor location to subtract out known delays in the signal paths, leaving as a difference the delay component due to the unknown/target signal path.

The aforementioned technique for determining propagation time does not require knowledge of individual components or elements in a long and/or complex signal path. This technique permits measurement of signal paths for which the target receiver location is remote or not physically accessible. This technique does not require a priori knowledge of the distance or delay between the two receiver locations when both are in free space. This technique does not require a beacon signal or an injected signal in the target signal path. This technique can utilize unknown signal sources, and does not require a priori knowledge of the signals, such as operating wavelength or location of the transmission source. Further, a priori knowledge of the band class or operating wavelength of receiving antennas is not required so long as the transmission medium of the observed signals is known. More precisely, operating wavelength need not be known if the velocity of propagation of the transmission medium between the two receivers at the wavelength of the observed signals is known.

DETAILED DESCRIPTION OF ILLUSTRATIVE EMBODIMENTS

Figure 1:
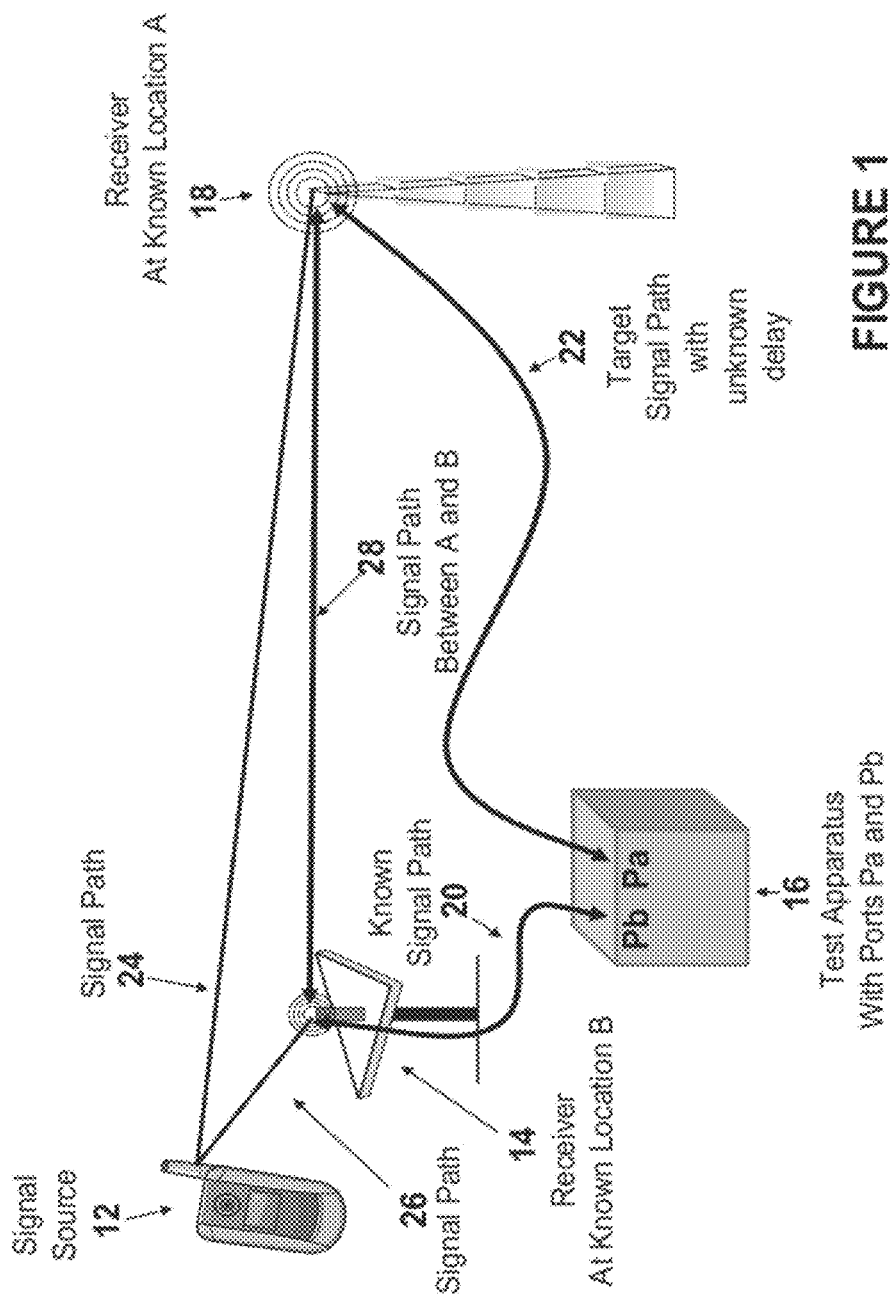
FIG. 1 depicts an example system for determining propagation time and effective distance between locations A and B.

FIG. 1 is a diagram of an example system for determining propagation time (also referred to herein as propagation delay) along an unknown signal path as well as for determining an estimate of the propagation delay between the receivers at locations A and B. The term receiver as used herein is used to refer to any type of receiver capable of receiving any type of signal. Thus, a receiver can refer to an antenna (e.g., an RF antenna), its mounts, connectors, and local electronics such as a low noise amplifier (LNA), tower top amplifier, or other RF signal processing apparatus in close, physical proximity to the antenna, or the like, or any combination thereof. As depicted in FIG. 1, the propagation time of signal path 22 (e.g., the target signal path with unknown delay) is the propagation time to be determined. To determine the propagation time of signal path 22, a test apparatus 16 is established. The test apparatus 16 is in communication with the receiver 14, located at B by way of a signal path 20 of known propagation delay. And the test apparatus 16 also is in communication with the receiver 18 at location A by way of the target signal path. The signal paths 22 and 20 terminate at the test apparatus 16 in test ports designated Pa and Pb respectively. The communication link between the test apparatus 16 and the receivers 14 and 18 may be by way of any transmission medium, such as a radio frequency transmission medium, wireless medium, wired medium, optical fiber medium, copper medium, microwave medium, or a combination thereof. The propagation time of signal path 20 is measurable using various means. In an example embodiment, location B is known and accessible, and the test apparatus 16 is communicatively coupled to receiver 14 via a wireless and/or wired medium. The propagation time or delay of the signal path 20 is determined via any appropriate means, such as for example, by physical measurement (e.g., determining the length of the communications medium connecting between location B and the test apparatus 16 and adjusting for the velocity of propagation of the transmission medium), by injecting a test signal into the signal path 20 at the known receiver location B at time $t_1$ and observing its arrival at the test apparatus 16 at time $t_2$ and arithmetically determining the propagation time thereof, by a test instrument such as a time domain reflectometer applied at either end of signal path 20, or by any combination thereof.

In an example embodiment, signals coming from multiple sources (depicted by signal source 12) at various locations are received by the receiver 14 and the receiver 18 along diverse signal paths 26 and 24 respectively, and are provided to the test apparatus 16 at ports Pb and Pa, respectively. Only a single signal source 12 is depicted for the sake of clarity. It is to be understood, however, that the receiver 14 and the receiver 18 receive signals from multiple sources located at a plurality of locations. The test apparatus 16 processes the received signals communicated from the two receivers to identify particular, common signals arriving at different times. Determining which signals are coming from a common source can be accomplished via any appropriate means. For example, signals can be correlated, convoluted, transformed to the frequency domain (e.g., Fourier transform, LaPlace transform, etc.) and spectrally analyzed, or the like, or any combination thereof, to determine which signals are coming from the same source. The test apparatus 16 is configured to determine the time at which a signal arrives at each of its two ports, Pa and Pb. For example, a signal originating from signal source 12 is received at port Pb via the signal paths 26 and 20 at a time designated Tb. And, the test apparatus 16 determines the time at which the same signal is received at port Pa from the signal source 12 via the signal paths 24 and 22. In the case that the signal source 12 is collinear or nearly collinear with receivers A and B, the path length 24 is equal to the sum of paths 26 and 28. It is noted that the delay due to signal path 26 is the same for signals arriving at either port. Assuming that signal paths 24, 26, and 28 are entirely through transmission media, such as air, with the same velocity of propagation, and thus the difference in arrival times at the ports Pa and Pb can be attributed to the difference in path length of path 20 for port Pb and paths 28 and 22 for port Pa.

Figure 2:
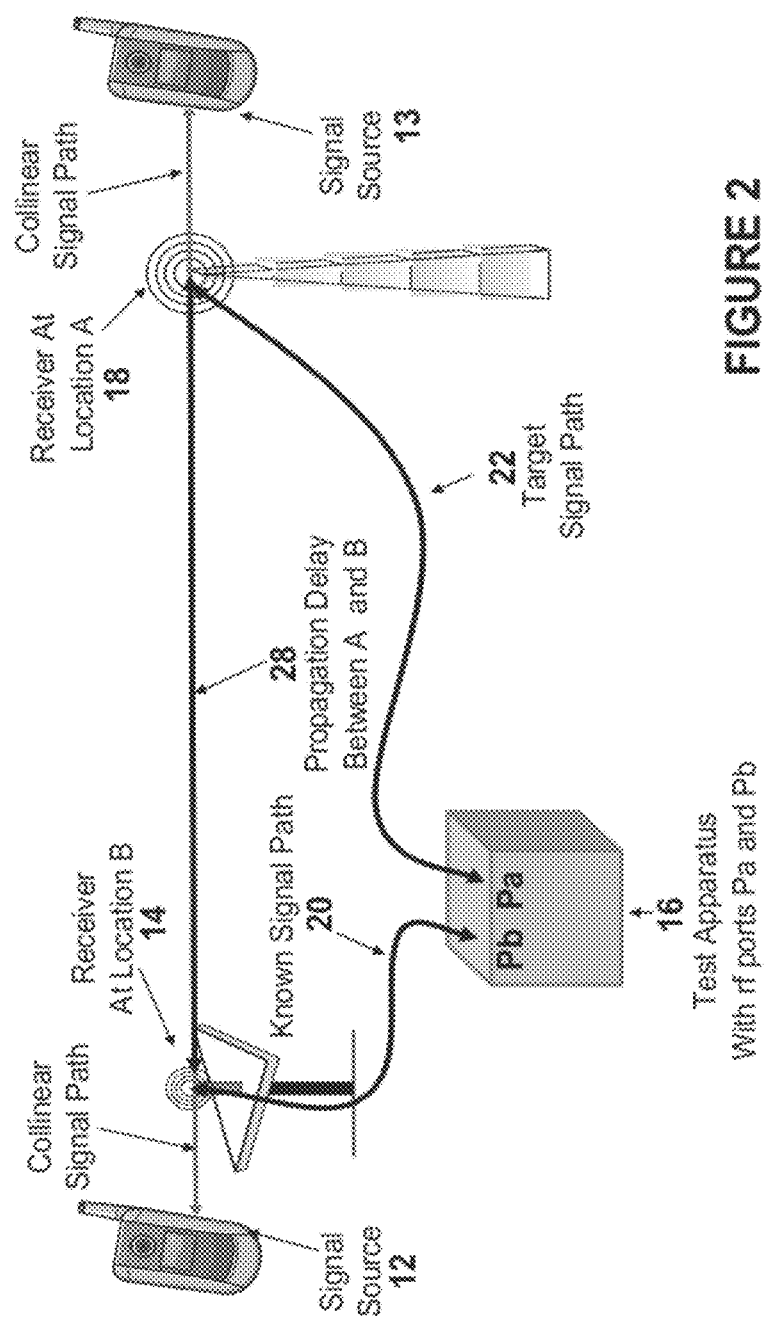
FIG. 2 graphically depicts an example system for determining propagation time wherein a signal source is on the same axis, (collinear, coaxial) with two receivers, and not between the two receivers.

FIG. 2 graphically depicts an example system for determining propagation time wherein a signal source is on the same axis, (collinear, coaxial) with two receivers, and not between the two receivers. FIG. 2 is simplified to show only signal sources collinear (or nearly collinear) with the receiver 18 at location A and receiver 14 at location B. And a second signal source 13 has been added near location A. Just as the test apparatus 16 is configured to determine the time of arrival at its ports of signals originating from source 12, the timing delay between ports Pa and Pb for signals from signal source 13 can be viewed as the difference in path lengths between receiver 18 at location A to the two ports of the test apparatus 16. The delay to port Pa is due to the target signal path 22 of unknown length and the path to port Pb is the sum of the paths 28 and 20. Note that the delay observed at ports Pa and Pb for signal sources close to the receiver 18 at location A will be different than the delay for signal sources close to receiver 14 at location B because the propagation delay between A and B (path 28) is combined differently with either path 20 or path 22 in the two cases.

The test apparatus 16 is configured to identify signal sources collinear or nearly collinear with the two receivers 18 and 14 without reliance on any other information than the RF signals arriving at ports Pa and Pb. Signals observed at the test apparatus 16 having the greatest observed delay between the two receiving ports originate from signal sources in free space located collinearly or nearly collinearly along the axis of locations A and B, and not between them. Knowing that signal path 20 has lower propagation delay than signal path 22, and not the absolute propagation delay of either path, the test apparatus 16 can identify which sources are collinear or nearly collinear with the receivers, and which are closer to the receiver at locations A versus the receiver at location B. A signal source near A is collinear with the receivers at locations A and B when $T_b - T_a$ is a maximum value for all signals observed—that is, when the magnitude of the time difference of arrival represented by the time of arrival at port Pb minus the time of arrival of the same signal at port Pa is a maximum. Similarly, a signal source near location B is collinear with the receivers at locations A and B when $T_b - T_a$ is a minimum for all signals observed arriving at both ports. Such signal sources may be independently occurring, so-called wild sources not in the control of the operators of the test apparatus, or may be arranged and positioned by the operators of the apparatus to fulfill the requirement that the source be collinear or nearly collinear with the two receivers.

The signal source 12 of FIG. 1 and FIG. 2 represents multiple sources at various locations. In an example embodiment, the signal sources and the signals emanating therefrom are not known a priori. That is, specific characteristics of the signals, such as carrier frequency, frequency band of operation, modulation scheme, etc, are not known prior to detection of the signals. The test apparatus 16 monitors all signals that are being received by receivers 14 and 16. In another example embodiment, however, a signal source, or sources can be placed at a known location, or locations. And, the test apparatus can process the signals coming from the known source or sources. For example, a signal source with known properties can be placed collinear with the two receivers 14 and 18, and not between them, to establish the propagation time of signal path 22 between the receiver at location A 18 and the test apparatus 16. The signal source 12 can comprise any appropriate signal source. The signal source 12 can comprise portable signal source (e.g., cellular phone), a non-portable device (e.g., transmitter on a cellular tower), a signal generator, or the like, or any combination thereof.

Further, the location of receiver 18 at location A need not be known if the range (absolute distance) from location A to location B be known. That is, the propagation time of the signal path 12 can be determined as described above knowing the location of A and B or the distance between them independent of location. In an example embodiment, the maximum delay between signals arriving at receivers 14 and 18 is statistically estimated, evaluating a statistical distribution of observed signal delays from multiple sources. In yet another example embodiment, the position on earth of location A and location B is determined by utilizing optical, surveyor, geo-location methods, or the like. With the position of each receiver location known, the distance between them is calculated as is the propagation delay between them for an RF signal in air.

In order to determine the propagation delay of the target signal path 22, the sum of the total delays of the other two path elements, 20 and 28, and the delays observed at ports Pa and Pb is calculated. The propagation delay introduced along signal path 20 from the receiver 14 at location B to the port Pb of the test apparatus 16 is known or can be determined by a variety of conventional path delay means as stated above. And, the delay of signal path 28 between the two receivers is estimateable as described above. The known delay components of paths 20 and 28 can be used in an equation that evaluates the total observed path delays including the known paths and the time difference of arrival of the signal traveling those two paths and arriving at the two test apparatus ports Pa and Pb:

$$\delta_{22} = \delta_{28} + \delta_{20} + \delta t \quad (1)$$

Wherein:
The Greek symbol lower-case delta, $\delta$, represents a propagation delay along a signal path; $\delta_{28}$ and $\delta_{20}$ represent the propagation delays due to signal paths 28 and 22 respectively, and $\delta t$ represents the absolute value of the time difference of arrival between ports Pa and Pb for a particular signal observed by the two receivers at locations A and B. The equation expresses the propagation delay, $\delta_{22}$, of the unknown signal path 22, assuming that path 22 is longer than the sum of paths 20 and 28. The time delay is subtracted if path 22 is shorter than the sum of paths 20 and 28.

Figure 3:
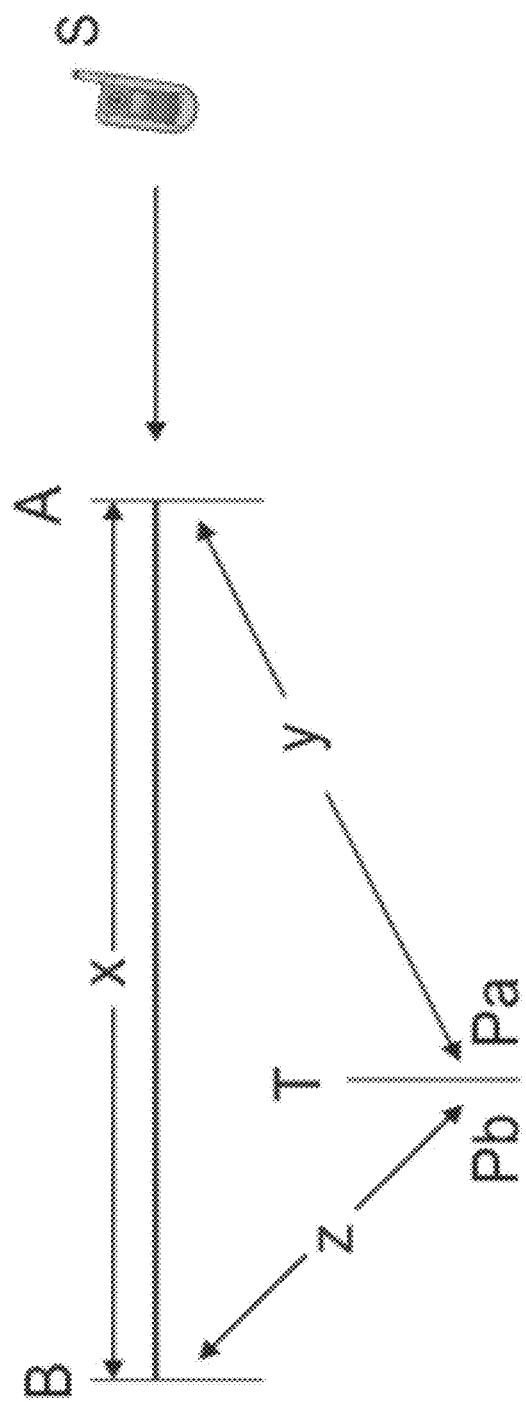
FIG. 3 depicts a signal source that is collinear or nearly collinear with the two receivers and a test apparatus connected to the receivers by one known and one unknown signal path, wherein the signal source is not located between the receivers.

To understand the application of Equation (1), refer to FIG. 3. FIG. 3 depicts the signal source, S, that is collinear with the receivers at locations B and A, and is not positioned between the receivers at locations B and A, together with a test apparatus, T. Segment "x" represents the signal path from location B to location A. Segment "y" represents the signal path from the test apparatus, T, to location A. Segment "z" represents the signal path from location A to the test apparatus, T. Comparing the terms in Equation (1) with the segments of FIG. 3 results in the following re-expression of the same relationships.

$$y = z + x + \delta t \quad (2)$$

The signal path associated with $\delta_{22}$ between receiver A and the test apparatus, 16, is represented by segment y. The signal path associated with $\delta_{20}$ between receiver B and the test apparatus, T, is represented by segment z. The signal path associated with $\delta_{28}$ being the free space path between receiver locations A and B is represented by segment x. The observed time delay of arrival of the signal at the two test ports Pa and Pb is expressed as $\delta t$ and is added or subtracted depending on whether path y is longer or shorter than paths z+x.

For a signal originating near location A, the time of signal arrival at port Pa of test apparatus T is determined by the time the signal reaches receiver A, plus the unknown time delay of the signal propagation in along signal path y. The time of arrival at port Pb of test apparatus T for the same signal is determined by the time the signal reaches receiver A, plus the known delays along signal paths x and z. Restated for clarity in a numerical example, for an example embodiment in which the signal path propagation delays are:

Delay along x=17 microseconds,
delay along z=4 microseconds,
and the difference in the signal's time of arrival between port Pa and Pb=3 microseconds, and path y is known to be shorter than paths z+x, then the path delay due to signal path y is calculated from Equation (2) by substituting values for x, z, and the time delay between ports is, y=17+4−3=17+4−3=18 microseconds To determine the propagation delay due to the target signal path 22 when the propagation delay of the signal path 28 between the two receivers is not known and the physical distance between the two receivers can not easily be determined, a related technique is introduced to estimate the propagation delay of the inter-receiver signal path. In an example embodiment, perhaps characteristic of the mobile telecommunications Radio Access Network (RAN) environment, the propagation delay associated with signal path 28 between receivers at location A and B can be calculated if two signal sources are available meeting requirements for location relative to the receivers. Each signal source is collinear or nearly collinear with the two receivers and not between the two receivers. One signal source is in proximity with location A, that is collinear along the line segment extending from location A away from B, while the other source is collinear along the line segment extending from location B away from A. FIG. 2 provides an illustration of such an arrangement. For each signal source the time delay between the signal arriving at ports Pa and Pb of the test apparatus 16 is calculated. The propagation delay of signal path 28 is expressed in the following formulas:

For the signal source closer to A:

$$\delta_{28} = \delta_{22} - \delta_{20} + |\delta t_A| \quad (3)$$

and for the signal source closer to B:

$$\delta_{28} = -\delta_{22} + \delta_{20} + \delta t_B \quad (4)$$

and summing the two equations:

$$2*\delta_{28} = \delta t_A + \delta t_B \quad (5)$$

and simplifying:

$$\delta_{28} = (\delta t_A + \delta t_B)/2 \quad (6)$$

Wherein:
$\delta_{20}$, $\delta_{22}$, and $\delta_{28}$ represent the propagation delay associated with the signal paths 20, 22, and 28 of FIG. 1 and FIG. 2, and $\delta t_A$ and $\delta t_B$ represent the time difference of arrival at ports Pa and Pb respectively of test apparatus 16, $\delta t_A$ indicating the time delay of arrival for a source in proximity with location A, and $\delta t_B$ indicating the delay observed for a source in proximity with location B.

In a numerical example, the time delay between ports Pa and Pb is observed to have a value of 45 microseconds for signals arriving from sources close to location A, and a value of 36 microseconds for signals arriving from sources close to location B. The propagation delay associated with the signal path 22 between receiver location A 18 and receiver location B 14 is then calculated to be the sum of the two delays divided by two—their mean. In this example the delay is:

x=(45 microseconds+36 microseconds)/2=40.4 microseconds.

Figure 4:
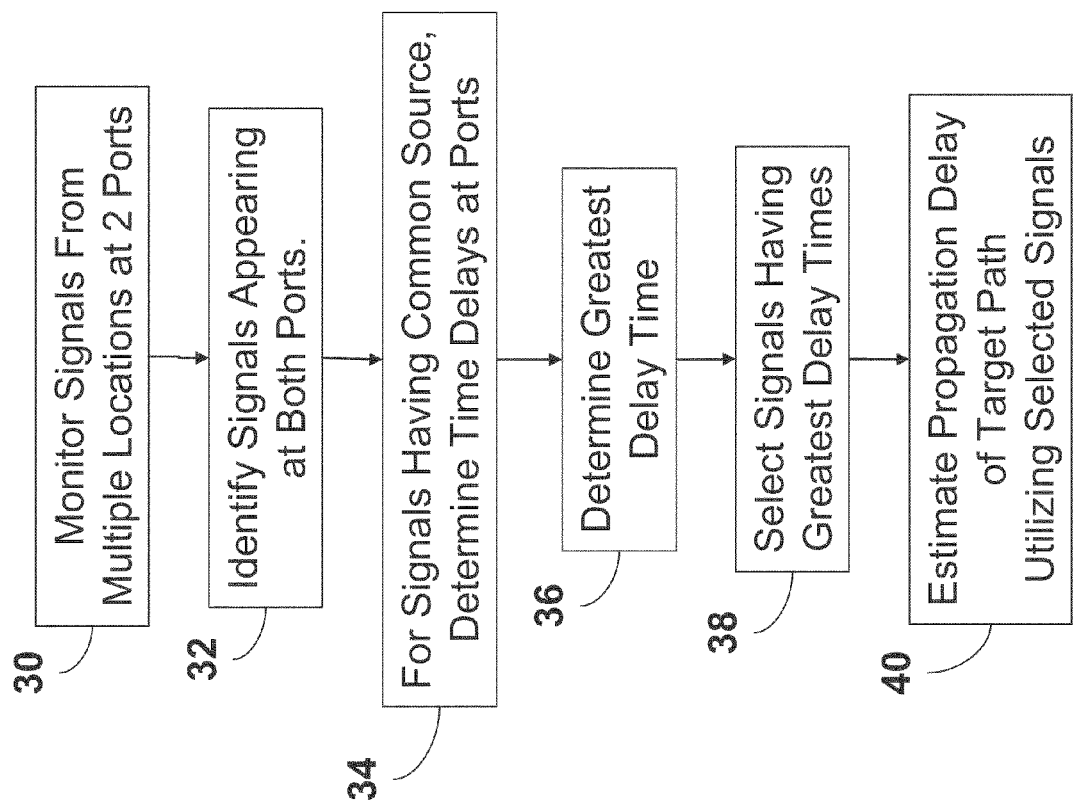
FIG. 4 is a flow diagram of an example process for determining propagation delay.

FIG. 4 is a flow diagram of an example process for determining propagation time at the test apparatus, T. At step 30, signals being received by at least two receivers are monitored. At step 32, it is determined which of the monitored signals have a common source. As described above determining which signals are coming from a common source can be accomplished via any appropriate manner. For example, signals can be correlated, convoluted, transformed to the frequency domain (e.g., Fourier transform, LaPlace transform, etc.) and spectrally analyzed, or the like, or any combination thereof, to determine which signals are coming from the same source.

At step 34, for each signals received at multiple locations and having a common source, the time delay between reception of a signal at the multiple location is determined. At step 36, the set of signals having the greatest time delay is determined. And, at step 38, a signal from the set of those having the greatest observed time delay is selected as the signal to use to estimate the propagation time of the target signal path. As described above, the signal having the greatest delay can be shown, geometrically, to be located on the same axis as the multiple receiver locations, and not between the multiple locations. As described above, the propagation time along the target signal path is estimated using the various propagation times associated with the selected signal at step 40.

Figure 5:
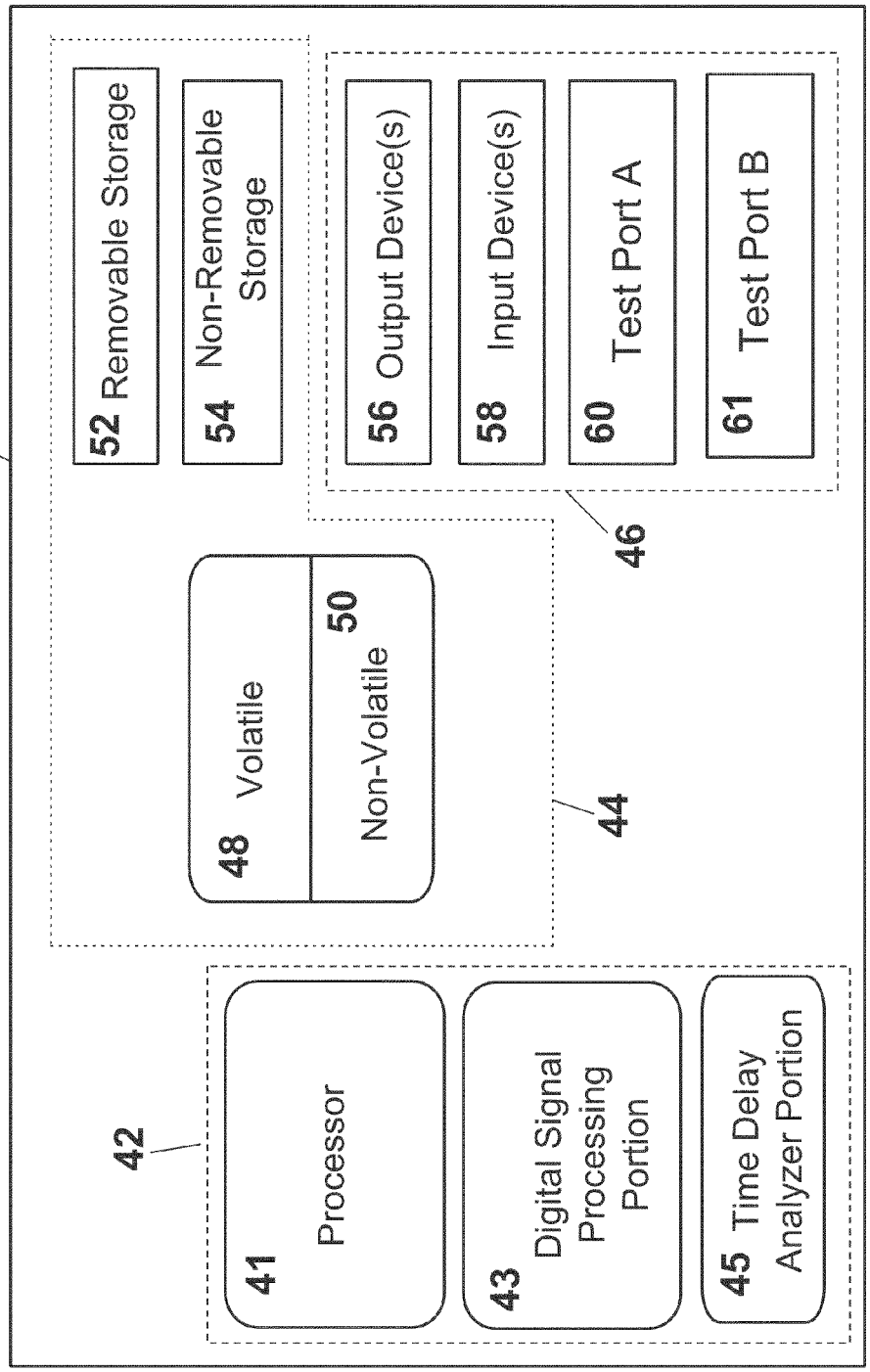
FIG. 5 is a block diagram of an example test apparatus configured to determine propagation time.

FIG. 5 is a block diagram of an example test apparatus 16 for determining propagation time. The test apparatus 16 depicted in FIG. 5 can represent any appropriate device, examples of which include a processor, a computer, a digital signal processing system, a server, a portable computing device, such as a laptop, a personal digital assistant ("PDA"), a portable phone (e.g., a cell phone or the like, a smart phone, a video phone), or any combination thereof. It is emphasized that the block diagram depicted in FIG. 5 is exemplary and not intended to imply a specific implementation or configuration. Thus, the test apparatus 16 can be implemented in a single processor or multiple processors (e.g., single server or multiple servers, single gateway or multiple gateways). The test apparatus 16 can be distributed, centrally located, and/or integrated. Multiple components of the test apparatus 16 can communicate wirelessly, via hard wire, or a combination thereof.

In an example configuration, the test apparatus 16 comprises a processing portion 42, a memory portion 44, and an input/output portion 46. The processing portion 42, memory portion 44, and input/output portion 46 are coupled together (coupling not shown in FIG. 5) to allow communications therebetween. The input/output portion 46 is capable of receiving and/or providing information from RF signal sources pertaining to determining propagation time as described above. In an example embodiment, the input/output portion 46 is capable of receiving signals from multiple locations through RF connection test ports 60 and 61, and as described above. In various configurations, the input/output portion 46 can receive and/or provide information via any appropriate means, such as, for example, optical means (e.g., infrared), electromagnetic means (e.g., RF, WI-FI, BLUETOOTH, ZIGBEE, etc.), acoustic means (e.g., speaker, microphone, ultrasonic receiver, ultrasonic transmitter), wired means, or a combination thereof.

The processing portion 42 is capable of performing functions pertaining to processing radio frequency signals and determining signal differential time of arrival between inputs as described above. For example, the processing portion 42 is capable of comparing multiple RF signals obtained at test ports 60 and 61, determining signals that have a common source (same signal displaced in time), determining time delays of signals having a common source, selecting a signal having a greatest time delay, estimating propagation delay, or any combination thereof, as described above. In support of these functions the processing portion 42 may include a processor 41, and digital signal processing (DSP) portion 43, and/or a time delay analyzer portion (45).

In a basic configuration, the test apparatus 16 can include at least one memory portion 44. The memory portion 44 can store any information utilized in conjunction with determining propagation time as described above. For example, the memory portion 44 is capable of storing information pertaining to a location of a transceiver, monitoring signals from multiple locations, determining signals that have a common source, determining time delays of signals having a common source, selecting a signal having a greatest time delay, estimating propagation delay, or any combination thereof, as described above.

Depending upon the exact configuration and type of test apparatus 16, the memory portion 44 can include computer readable storage media that is volatile 48 (such as some types of RAM), non-volatile 50 (such as ROM, flash memory, etc.), or a combination thereof. The test apparatus 16 can include additional storage, in the form of computer readable storage media (e.g., removable storage 52 and/or non-removable storage 54) including, but not limited to, RAM, ROM, EEPROM, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory, or any other medium which can be used to store information and which can be accessed by the test apparatus 16.

The test apparatus 16 also can contain communications connection(s) identified as input and output devices 56 and 58 that allow the test apparatus 16 to communicate with other devices, network entities, receivers, or the like. A communications connection(s) can comprise communication media. Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. The term computer readable media as used herein includes both storage media and communication media. The system also can have input device(s) 58 such as keyboard, mouse, pen, voice input device, touch input device, etc. Output device(s) 56 such as a display, speakers, printer, etc. also can be included.

Figure 6:
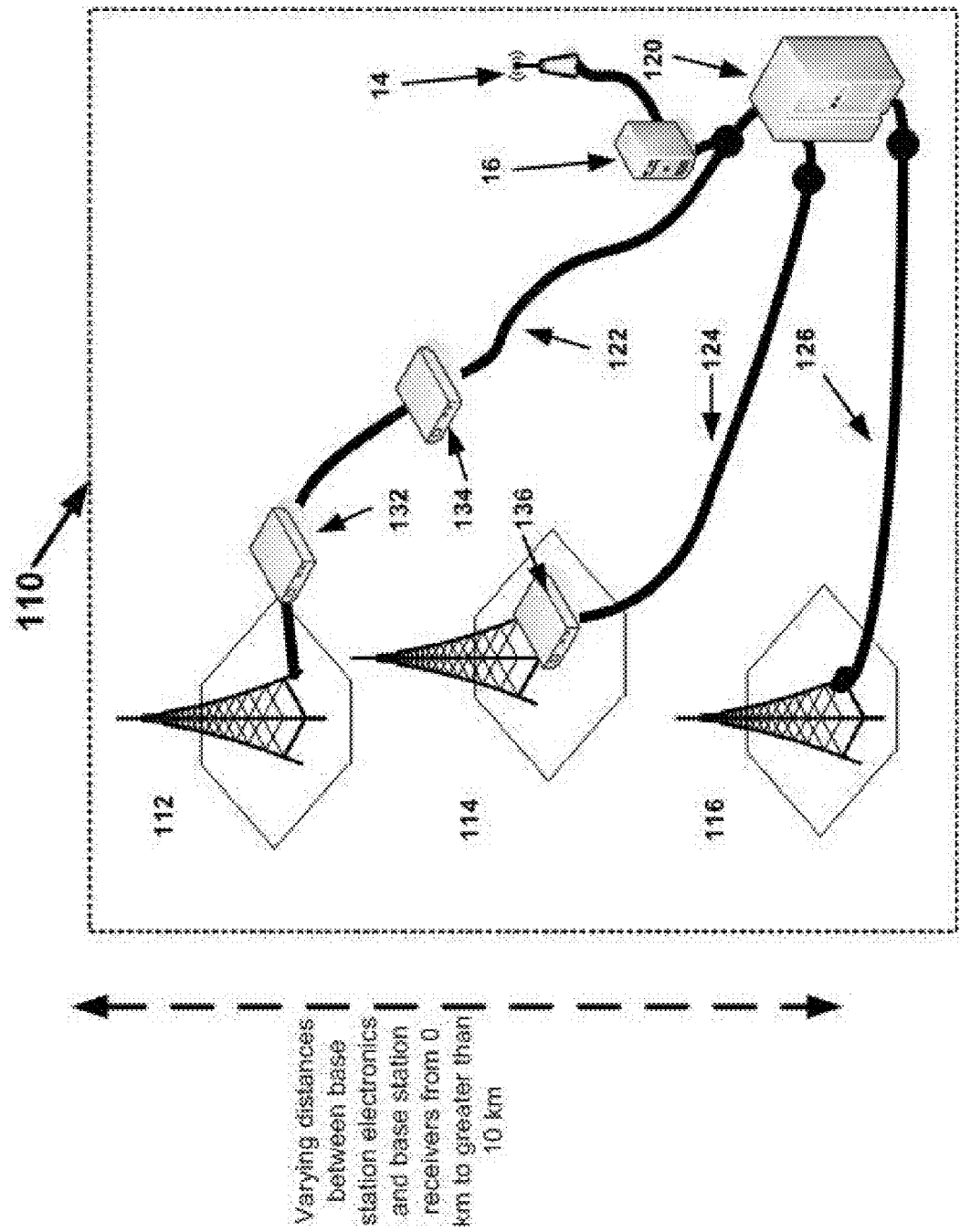
FIG. 6 depicts a block diagram of an exemplary mobile cellular radio system with signal paths connecting between a set of distributed (remotely located) antennas or receivers and controlling electronics, showing a diversity of routes for cables or connections and a set of propagation delay producing elements along each signal path.

FIG. 6 depicts a graphical representation of a distributed wireless telecommunications base station 110 commonly identified as a BSS or distributed NodeB. In keeping with common wireless industry practice the main base station electronics 120 are integrated into a base station equipment rack or shelter. Terminated at the base station electronics are a multiplicity of RF connections 122, 124, and 126 which connect the base station electronics to radio receivers indicated here graphically as elements 112, 114, and 116. These radio complexes may be referred to wholly or in part as receivers, transceivers, and/or antennas. Pertaining to the range of physical distances between the base station electronics and the remote receivers making up the distributed base station system, distances between the base electronics and an individual receiver may range from a few meters to distances greater than 10 kilometers. In a simple case, such as depicted by signal path 126, the signal path is direct from the receiver to the base station electronics. But even the simplest signal path delay may be difficult to estimate by means of direct physical measurement of cables, connectors, or other path elements. In more complex cases, such as depicted by signal paths 122 and 124, the path length may be too great to measure directly, and the path may contain electronic elements 132, 134, and 136 which introduce additional propagation delay. Furthermore, these elements may allow RF connections in one direction only, which obviates use of conventional signal path measurement devices such as oscilloscopes or time domain reflectometers. And for some antenna paths the length, the complexity of elements along the path, and the possibility that some elements exhibit different velocity of propagation characteristics contribute significantly to the complexity of the measurement task, introducing measurement inaccuracy and/or adding to measurement cost. An example application of the herein described signal path delay determination suggests installation of the test apparatus 16 and an associated receiver 14 close to the base station electronics for the purpose of monitoring a target signal path. In the embodiment of FIG. 6 the test apparatus 16 is shown connected to signal path 122 at a point close to the base station electronics 120. Connection is by way of any method such as access probe, tap, tee connector, reconnection, or other method of monitoring the target signal path.

Figure 7:
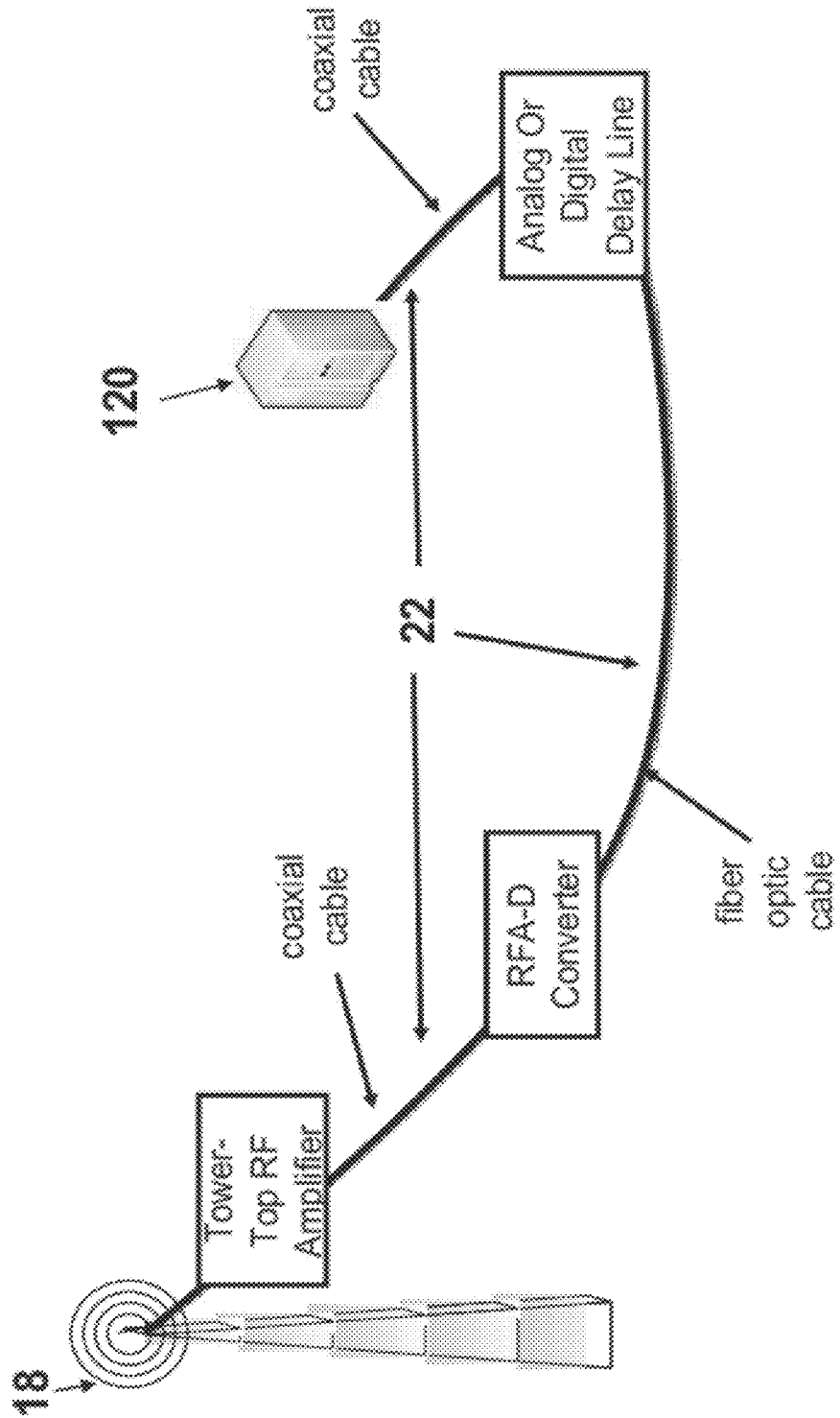
FIG. 7 illustrates an exemplary mobile cellular radio signal path between a receiver and associated controlling base station electronics including a plurality of representative signal path elements, each with an associated, unknown propagation delay, along a respective signal path.

FIG. 7 illustrates radio access network components of a typical GPRS base station in which propagation time can be determined as described herein. In this representative embodiment the base station electronics 120 are connected to a receiver 18 by means on a complex signal path with unknown propagation delay 22. Contributing to the total propagation delay of the path may be myriad aspects including but not limited to unknown physical length of the signal path, use of cable types, conductors, and connectors with varying velocity of propagation parameters along the signal path (indicated in FIG. 7 as coaxial cables and fiber optic cable), together with active and passive electronic elements such as tower-top RF amplifiers, RF A-D converters, and analog or digital delay lines.

While example embodiments of determining propagation time have been described in connection with various computing devices/processor, the underlying concepts can be applied to any computing device, processor, or system capable of determining propagation time. The various techniques described herein can be implemented in connection with hardware or software or, where appropriate, with a combination of both. Thus, the methods and apparatuses for determining propagation time, or certain aspects or portions thereof, can take the form of program code (i.e., instructions) embodied in tangible storage media, such as floppy diskettes, CD-ROMs, hard drives, or any other machine-readable storage medium (computer-readable storage medium), wherein, when the program code is loaded into and executed by a machine, such as a computer, the machine becomes an apparatus for determining propagation time. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

The methods and apparatuses for determining propagation time also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for determining propagation time. When implemented on a general-purpose processor, the program code combines with the processor to provide a unique apparatus that operates to invoke the functionality of determining propagation time. Additionally, any storage techniques used in connection with determining propagation time can invariably be a combination of hardware and software.

While determining propagation time has been described in connection with the various embodiments of the various figures, it is to be understood that other similar embodiments can be used or modifications and additions can be made to the described embodiment for determining propagation time without deviating therefrom. For example, one skilled in the art will recognize that determining propagation time as described in the present application may apply to any environment, whether wired or wireless, and may be applied to any number of such devices connected via a communications network and interacting across the network. Therefore, determining propagation time should not be limited to any single embodiment, but rather should be construed in breadth and scope in accordance with the appended claims.

What is claimed:

1. A computer-readable storage medium that is not a transient signal, the computer-readable storage medium having instructions stored thereon, that when executed by at least one processor perform a method comprising:
   detecting a first plurality of signals at a first location;
   detecting a second plurality of signals at a second location;
   determining which signals of the first plurality and which signals of the second plurality are indicative of coming from a common source;
   determining pairs of signals indicative of coming from a common source, wherein a pair of signals comprises a signal from the first plurality and a signal from the second plurality;
   determining time delays for the pairs of signals indicative of coming from the common source, wherein a time delay indicates a time difference of arrival at a third location between reception of a signal from the first location and the second location;
   determining a maximum time delay from among the determined time delays;
   selecting a set of signals exhibiting the maximum time delay; and
   estimating a propagation delay from the third location to the second location by combining propagation times of the selected set of signals between the first location and the third location and between the first location and the second location, together with an observed time delay at the third location of the selected set of signals.

2. The computer-readable storage medium of claim 1, wherein:
   characteristics of the first plurality of signals are not known prior to detecting the first plurality of signals; and
   characteristics of the second plurality of signals are not known prior to detecting the second plurality of signals.

3. The computer-readable storage medium of claim 1, the steps further comprising estimating a propagation delay of the signal path between the first location and the second location by comparing a time delay of signals indicative of coming from a common source arriving at the third location from signal sources proximate to the first location with signals indicative of coming from a common source arriving at the third location from signal sources proximate to the second location.

4. The computer-readable storage medium of claim 1, wherein a known signal source is utilized to generate common source signals, wherein the known signal source is collinear with an axis between the first location and the second location.

5. The computer-readable storage medium of claim 1, wherein a distance between the first location and the second location is unknown.

* * * * *